United States Patent [19]

Feist et al.

[11] Patent Number: 4,659,493

[45] Date of Patent: Apr. 21, 1987

[54] PROCESS FOR PRODUCING NOVEL PRODUCTS BY HYDROGEN FLUORIDE WITH ESTERS OF FATTY ACIDS

[75] Inventors: Heinz-Rudi Feist; Hans Buchwald, both of Hanover; Boleslaus Raschkowski, Wiedensahl; Werner Rudolph, Hanover, all of Fed. Rep. of Germany

[73] Assignee: Kali-Chemie Aktiengesellschaft, Hanover, Fed. Rep. of Germany

[21] Appl. No.: 655,568

[22] Filed: Sep. 28, 1984

[30] Foreign Application Priority Data

| | | | |
|---|---|---|---|
| Oct. 3, 1983 | [DE] | Fed. Rep. of Germany | 3335870 |
| Jul. 18, 1984 | [DE] | Fed. Rep. of Germany | 3426438 |

[51] Int. Cl.$^4$ ...................... C10M 105/34; C09F 7/00

[52] U.S. Cl. .................................. 252/54.6; 260/408; 514/785

[58] Field of Search ........................ 260/408; 560/227; 252/54.6

[56] References Cited

U.S. PATENT DOCUMENTS

| | | | |
|---|---|---|---|
| 1,944,941 | 1/1934 | Lincoln | 260/408 |
| 2,109,357 | 2/1938 | Lincoln | 260/408 |
| 2,262,773 | 11/1941 | Lincoln | 252/54.6 |
| 2,300,403 | 11/1942 | Byrkit | 260/408 |
| 2,621,159 | 12/1952 | Perry | 252/54.6 |
| 2,670,361 | 2/1954 | Croston | 260/407 |
| 2,837,547 | 6/1958 | Columbus | 260/407 |
| 2,926,139 | 2/1980 | Mott | 252/54.6 |
| 4,036,769 | 7/1977 | Zipf | 252/54.6 |
| 4,492,641 | 1/1985 | Buchwald | 252/54.6 |

FOREIGN PATENT DOCUMENTS

| | | | |
|---|---|---|---|
| 59-27979 | 2/1984 | Japan | 252/54.6 |
| 452579 | 8/1936 | United Kingdom | 260/408 |
| 453830 | 9/1936 | United Kingdom | 260/408 |
| 1376669 | 12/1974 | United Kingdom . | |

OTHER PUBLICATIONS

Pattison, J. Am. Chem. Soc., 79, pp. 2306–2311 (1957).

*Primary Examiner*—Michael L. Shippen
*Attorney, Agent, or Firm*—Schwartz, Jeffery, Schwaab, Mack, Blumenthal & Evans

[57] ABSTRACT

A process is disclosed for reacting hydrogen fluoride with a fatty acid ester having a melting point less than than 60° C. The resulting products and various applications for them as lubricants, lubricant additives and pharmaceutical carriers are also described.

10 Claims, No Drawings

PROCESS FOR PRODUCING NOVEL PRODUCTS BY HYDROGEN FLUORIDE WITH ESTERS OF FATTY ACIDS

BACKGROUND OF THE INVENTION

The present invention relates to a process for reacting hydrogen fluoride with esters of fatty acids, to reaction products produced by the aforementioned process, and to various uses for the reaction products.

German Pat. No. 551,787 discloses a process for the reaction of fatty acid glycerides of vegetable and animal origin with hydrogen fluoride. In the disclosed process, triglycerides are reacted directly with hydrogen fluoride at temperatures less than 100° C. As reaction products, polymers are obtained having a degree of polymerization which varies as a function of reaction time.

SUMMARY OF THE INVENTION

It is an object of the present invention to provide a process for reacting hydrogen fluoride with a different class of substances than the fatty acid glycerides disclosed by the aforementioned German patent.

It is another object of the present invention to provide a process for producing novel, industrially useful compounds by reacting hydrogen fluoride with a specific class of fatty acid esters characterized by melting point.

It is yet another object of the present invention to provide novel end-products of a reaction involving hydrogen fluoride, which end-products are useful in lubricants, pharmaceutical compositions, and cosmetic preparations.

In accomplishing the foregoing objects, there has been provided, in accordance with one aspect of the present invention, a process comprising the step of reacting hydrogen fluoride with at least one fatty acid ester at a temperature of less than 100° C., the fatty acid ester having a melting point of Tm less than about 60° C. In a preferred embodiment, the hydrogen fluoride is reacted with a mixture of esters obtained from long chain carboxylic acids and monoalcohols having a total of about 34 to 50 carbon atoms.

In accordance with another aspect of the present invention, there have been provided fatty acid ester derivatives comprising a compound produced by a process comprising the step of reacting hydrogen fluoride with at least one fatty acid ester at a temperature of less than 100° C., the fatty acid ester having a melting point Tm less than about 60° C. In one preferred embodiment, the hydrogen fluoride and the fatty acid ester are reacted in a molar ratio between about 0.1:1 and about 2:1. In another preferred embodiment, the hydrogen fluoride and the fatty acid ester are reacted in a molar ratio between about 2:1 and about 15:1 under other selected reaction conditions.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

In the process according to the present invention, a wax is used which has a melting point of Tm less than about 60° C., preferably less than about 40° C. A "wax" in the context of the present invention is defined as (a) an ester obtained by reacting a fatty acid, preferably an unsaturated fatty acid, with a monoalcohol which is preferably unsaturated, or (b) a mixture of such fatty acid esters. A preferred wax in the present invention comprises a mixture of esters produced by reacting long chain carboxylic acids with monoalcohols, having a total of about 34 to 50 carbon atoms. Particularly preferred are fatty acid esters having an iodine number of less than about 95, preferably from about 30 to 95, and in particular from about 75 to 95. Mixtures of such fatty acid esters are commercially available as synthetic products or as products of animal or vegetable origin. According to the present invention, synthetic products or products derived from vegetable matter are preferably used as starting materials.

The reaction of the present invention is carried out at a temperature of less than 100° C., in particular at temperatures between about 0° and about 80° C. Although it is possible to operate at atmospheric pressure, higher pressures are preferred, for example, in the range of about 1.1 to about 10 bar.

Depending on the precise reaction conditions used, different reaction products are obtained in accordance with the present invention.

One type of reaction product is obtained under relatively mild process conditions. More specifically, the reaction is preferably conducted at the lower ends of the respective temperature and pressure ranges mentioned above, for example, from about 1.1 to 5 bar and 0° to 30° C. To obtain this type of reaction product, the molar ratio of hydrogen fluoride to wax is maintained in the range of about 0.1:1 to about 2:1, in particular about 0.4:1 to about 1.8:1.

The products of the above-described type of reaction (hereinafter referred to as "adducts") are fluorine-containing, wax-like masses, apparently produced by the addition of hydrogen fluoride to fatty acid esters, the fluorine content of which varies within a wide range, depending of the reaction conditions. Under very mild conditions, that is, with short reaction times and/or low temperatures and/or a relatively small amount of hydrogen fluoride, adducts with a low fluorine content, a relatively high iodine member, and a low melting point are obtained. In contrast, under conditions that are not as mild, that is, with longer reaction times and/or higher temperatures and/or a larger amount of hydrogen fluoride, adducts with a higher fluorine content, relatively lower iodine number, and a higher melting point are obtained. In general, the fluorine content of the adducts of the present invention is in the range of about 0.1 to about 4.3% by weight.

In accordance with the present invention, adducts having iodine numbers in the range between the iodine number of the liquid wax used and virtually zero can be produced. By varying the fluorine content, furthermore, the melting point of the adduct can be affected. To this end, it is possible with the present invention to provide increasingly inert and higher melting waxes, thereby supplementing the spectrum of conventional waxes. The adducts of the present invention can be used, for example, as components in mold release agents, in lubricants, particularly in cooling lubricants, and in additives for lubricant mixtures.

An entirely different type of reaction product is obtained when more drastic process conditions within the above-mentioned range are used. To obtain this type of reaction product, the pressure and/or temperature used are in the upper portions of the respective ranges, for example, 3 to 10 bar and/or 20° to 80° C. Quite importantly, a molar ratio of hydrogen fluoride to wax of about 2:1 to about 15:1, preferably about 4:1 to about 10:1, is used.

The products of this reaction (hereinafter referred to as "sesquimers") are oily products which have a molar weight which is 1.1 to 1.9, in particular 1.2 to 1.6, times to molar weight of the starting wax, and which have an unreacted wax content of less than 1% by weight. When a mixture of fatty acid esters is used as the starting wax, the molar weight of the sesquimer is to be taken as the average molar weight of the mixture. Surprisingly, the sesquimers are not mixtures of monomers and polymers, such as dimers, trimers, or oligomers having a corresponding mean molar weight. The reaction mechanism and the constituency of the sesqimers has not been completely clarified, but it is considered certain that the reaction of the present invention does not involve polymerization, contrary, e.g., to the process of German Pat. No. 551,787.

Sesquimers of the present invention contain only very small amounts of bound fluorine, or none at all. Generally, the fluorine content is less than about 0.1% by weight.

Compared with the wax starting material, the sesqimers of the present invention have a significantly lower iodine number, preferably within a range of 1 to 20, more preferably 5 to 20. Additional characteristics and spectroscopic data for preferred sesquimers are presented in the examples set out below.

The sequimers and adducts of the present invention are industrially valuable products. A preferred application for them is in lubricants, particularly cooling lubricants. In view of their good friction wear properties and high thermal stability, the sesquimers of the present invention, either per se or as additives, may be used in high quality lubricants, for example, for engines, gears, refrigerating machinery, so that other lubricant additives, for example, high pressure additives, may be omitted.

The sesquimers may also be employed as hydraulic fluids and, given their thermal stability and high flash point, particularly as heat transfer fluids.

The sesquimers are especially suitable for use in cooling lubricants for machining, parting or abrasive processing of different materials, especially metals. Particularly preferred are cooling lubricants based on fluorochlorohydrocarbons (FHC). A cooling lubricant of this type consists of from about 0.5 to 25% by weight, preferably from about 0.5 to 5% by weight, of sesquimers and/or adducts of the present invention, from about 99.5 to 75% by weight, preferably from about 99.5 to 95% by weight, of a fluorochlorohydrocarbon having 1 or 2 carbon atoms and a boiling point of more than 20° C. In particular, trichloromonofluoromethane, 1,1,2-trichloro-1,2,2-trifluoroethane, 1,1,2,2-tetrachlorodifluoroethane, tetrachloromonofluoroethane and trichlorodifluoroethane are suitable.

It is also possible, in accordance with the present invention, to replace a portion of the sesquimers or the adducts in a composition as described above with the wax initially used as a starting material, in accordance with the present invention, and/or a sulfochlorinated or sulfidated derivative of the wax.

In those cases wherein the cooling lubricant itself evaporates too rapidly, up to about 35% by weight, preferably up to about 15% by weight, of the FHC can be replaced with a toxicologically harmless solvent, to control evaporation. Lower aliphatic ketones with 3 to 4 carbon atoms are suitable in this regard. Solvents to control evaporation normally have a higher boiling point than the FHC used. Particularly preferred are ethanol, n-propanol and isopropanol.

Another embodiment of the present invention provides for the addition of solubilizers for the sesquimer or the adduct. As sesquimer or adduct solubilizers, known, toxicologically harmless solvents with solubilizing properties can be used; they may replace up to 10% by weight of the FHC.

Aliphatic hydrocarbons are preferably used as sesquimers or adduct solubilizers, and may also serve as evaporation controllers in a concentration of up to about 15% by weight of the FHC. Suitable aliphatic hydrocarbons or gasoline fractions, for example, gasoline with a boiling range of 40°–80° C., can be used. Hydrocarbons capable of forming an azeotrope with the FHC are preferred. A concentration optimally corresponding to the azeotropic composition is used. The addition of n-heptane has been found to be especially useful.

Also preferred are sesquimer or adduct solubilizers select from the group of long chain aliphatic alcohols containing 16 to 24 carbon atoms, and preferably one or more carbon double bond.

Up to 1% by weight, relative to the FHC, of known corrosion inhibitors can be added to the cooling lubricant. Suitable corrosion inhibitors for metals, such as magnesium, aluminum, titanium, brass, bronze and steel, are commercially available. The inhibitors are based primarily on compositions containing organic compounds with hetero-atoms, such a sulfur and, in particular, nitrogen. Individual compounds or mixtures of the class of benzothiazoles, such as mercaptobenzothiazole, benzimidazoles (for example 2-phenylbenzimidazole)-triazoles (for example, benzotriazoles) tolyltriazoles, oxazolines (for example, alkyl and hydroxyalkyl-substituted oxazolines)amides, and amines (for example, tertiary amines), are suitable.

In one embodiment of the present invention, 10% by weight of the FHC is replaced by solubilizers for the corrosion inhibitors. The selection of the corrosion inhibitor solubilizers is governed by the same general criteria applicable to the selection of the solubilizers for the sesquimers or adducts. Preferred solubilizers both for the inhibitors and also for the sesquimer or adduct, are lower aliphatic alcohols with 1 to 5 carbon atoms. Specifically, ethanol, n-propanol, and isopropanol are suitable, which alcohols, as mentioned above, can be used simultaneously as evaporation controllers.

If an additive performs more than one function, its maximum concentration is not calculated additively, but is based on the highest individual concentration.

The cooling lubricants described above may be employed in the working of metals, using known methods. For example, the lubricants may be applied in the form of a liquid or an aerosol. Furthermore, they may be applied both externally, i.e., introduced to the tool from the outside, or internally, i.e., through suitable conduits in the tool itself. Internal applications are used, for example, in producing deep boreholes or in internal grinding. A cooling lubricant within the present invention may also be used generally in the machining, parting and abrasive processing of hard meterials.

Good results are obtained by the use of sesquimers or adducts in the machining, parting and abrasive processing of metals. Thus, compared with the use of trichloromonofluoromethane as the only cooling lubricant, an appreciably lower energy consumption is observed when a cooling lubricant of the present invention is used in the machining, parting and abrasive processing of metals like magnesium, aluminum, titanium, brass, bronze, steel. The improved energy saving is particularly apparent in the drilling, milling and cutting of compact pieces of metals. Surprisingly, the improvement is especially noticeable if the cooling lubricant contains a corrosion inhibitor, preferably based on oxazoline.

It is also surprising that there is practically no greasing of the metal surface, which in view of the wax like or oily character of the sesquimers or adducts was not to be expected.

Furthermore, satisfactory removal of chips is assured and chip buildup is prevented. Cooling and lubricant properties are very good. A comparison of friction wear properties with those of a commercial product also shows advantages obtained with the present invention.

Since the cooling lubricants of the present invention are toxicologically harmless, there is no danger of exceeding the maximum permissible workplace concentration specified by law.

The process according to the present invention for the reaction of hydrogen fluoride with fatty acid esters is preferably carried out, for both sesquimers and adducts, in the presence of inert solvents. In the process for preparing adducts, the selection of solvent is less important, and the process may be carried out in solvents as different as, for example, chlorinated hydrocarbons, such as carbon tetrachloride and methylene chloride, in fluorochlorohydrocarbons, such as 1,1,2-trichloro-1,2,2-trifluoroethane, 1,1,2,2-tetrachlorodifluoroethane, aromatic solvents, such as benzene, and substituted aromatic solvents, such as toluene and xylene. It is also possible to carry out the process without a solvent.

The process for the preparation of sesquimers is, on the other hand, influenced significantly by the solvent. Substituted aromatic solvents, in particular toluene and xylene, have been found to be excellent solvents.

The processing of the reaction products is not critical for either the sesquimers or the adducts of the present invention. The adducts may be filtered and washed after neutralization and optional concentration. Adducts with high iodine numbers and sesquimers are isolated conveniently by removing the solvent. Further purification steps which are conventional to the art, such as distillation, chromatography or refining, may be applied.

It has also been found that the sesquimers of the present invention can be used in the preparation of pharmaceutical and cosmetic compositions. The corresponding use of waxes (referred to hereinafter as "monomers") that melt at a temperature under 60° C., including those employed in producing the sesquimers of the present invention is known to the art. However, the use of sesquimers in accordance with the present invention yields surprising advantages.

For example, there are technical improvements, such as better temperature stability, in the sense that the separation (grit formation) often associated with reductions in temperature is largely prevented in the pharmaceutical and cosmetic compositions of the present invention. In a temperature-storage test, such compositions showed an improved thermal stability compared with the monomers. Moreover, no odor was detectable from the compositions themselves.

Sesquimers also differ from monomers in that the former display improved processibility in medicinal preparations. Compared to monomers, emulsifiability of preparations containing the sesquimers is improved, i.e., less emulsifier is required to obtain the same emulsion quality, so the undesirable side effects of the emulsifier can be avoided or extensively reduced. No phase separation in a sesquimer-based emulsified product within the present invention was obtained in a centrifuge test.

In view of these improved properties, there are numerous advantages to using the sesquimers, according to the present invention, in cosmetic preparations, such as ointments, creams, emulsions, oils, suspensions, lotions, and powders. The sesquimers of the present invention can also be used to advantage in pharmaceutical preparations, as carriers or coatings for medical preparations, and as additives in fermentation processes. It is possible to substitute them for conventional matrix lubricants like stearic acid, paraffin, glycerine, jojoba and other wax-like substances. Furthermore, granular, powdery and tablet preparations can be rendered hydrophobic with the sesquimers of the present invention. The sesquimers can also be used in the preparation of galenic compositions, such as tablets, coated tablets, capsules, powders, granules, suspensions, emulsions, oils, and syrups.

The use of the sesquimers in the preparation of topically applicable compositions is especially preferred. Not only are the aforementioned advantageous properties of the sesquimers fully realized in such compositions, but preparations with a rapid permeation rate are also obtained. It has been discovered, moreover, that the sesquimers contribute to an enhanced inhibition of an unduly rapid proliferation of the basal cellular layer, located in the corium, into the epidermis, thereby providing an especially beneficial and healing effect for the skin. Accordingly, cosmetic and pharmaceutical preparations, in particular topically applicable preparations, containing the above-described sesquimers are considered an important aspect of the present invention.

The following examples illustrate the production of both sesquimers and adducts, and provide characteristic data for the adducts and the sesquimers thus prepared in accordance with the invention. Also exemplified are cooling lubricants containing sesquimers and/or adducts, which compositions have been found to be most effective in the working of metals.

All percent data cited are by weight. Further, IN=iodine number; S=sesquimer and A=adduct (the number following the letter designation refers to the experiment describing the preparation of the sesquimer or adduct); ester=wax used, SC=sulfochlorinated, i.e., a product obtained by the addition of sulfur and chlorine to the double bond of the wax; and Su=a product obtained by the addition of sulfur to the double bond of the wax. Further, R11=trichloromonofluoromethane, R112=1,1,2,2-tetrachlorodifluoroethane, R113=1,1,2-trichloro-1,2,2-trifluoroethane, R121=tetrachloromonofluoroethane, and R122=trichlorodifluoroethane.

The waxes and the corrosion inhibitors used in the examples are commercial products. The triazole agent is based on benzotriazole, the oxazoline agent on an alkyl- and hydroxyalkyl-substituted oxazoline. Molar weights cited are mean molar weights.

EXAMPLE 1

Synthesis of Adducts

In a 1 liter stainless steel pressure vessel with an agitator, a solution of the ester (IN=82) in xylene was reacted with 6 g of HF at a temperature of 25° C. The reaction time, including the afterreaction, amounted to approximately 5 hours. Following the completion of the reaction, the reaction solution was flushed with nitrogen and neutralized with KOH granules. The acid-free product was filtered and the solvent removed in a rotating evaporator. A solid product was obtained.

Further reaction conditions and data of the products obtained are compiled in Table 1.

TABLE 1

| Preparations of adducts | | | | | | | |
|---|---|---|---|---|---|---|---|
| Exp. | Ester [g] | Xylene [g] | Time [h] | Pressure [bar] | IN | Mp. [°C.] | Fluorine Content [%] |
| 1.1 | 100 | 500 | 5.5 | 5 | 31.9 | 52–54 | 2.54 |
| 1.2 | 300 | 300 | 5 | 4 | 52.3 | | 1.43 |
| 1.3 | 400 | 300 | 5 | 4 | 67.1 | 25–31 | 0.66 |

EXAMPLE 2

Synthesis of Sesquimers

In a 5 Liter stainless steel pressure vessel with an impeller agitator, a solution containing 1.5 kg of ester (IN=82, M=606 g/mole, melting point approximately 11° C.) in 1.5 liters of xylene was placed and 350 to 380 g of HF under pressure in the reaction vessel. The internal temperature was adjusted to 50° C. and the rotating velocity of the agitator was 200 to 300 rpm. Following a reaction period of 5 hours, agitation was continued for 5 hours. The reaction mixture was then processed by blowing off the unreacted HF and the vessel was flushed with nitrogen. Neutralization was effected with solid KF.

The residual acidicity was removed with KOH granules. The acid-free product was filtered and the solvent drawn off in a rotating evaporator. The result was a golden yellow, viscous oil with the following physical and chemical properties:

| | | |
|---|---|---|
| C-bound fluorine | 0.02% by weight | |
| Hydrolyzable free fluorine | 0.002% by weight | |
| Iodine number | 14 | |
| Molar weight | 790 g/mole | |
| Density (at 25° C.) | 0.9125 g/cm$^2$ | |
| Viscosity (at 50° C.) | 194.4 mm$^2$/sec | |
| Neutralization number | (less than 0.005) | |
| Acid number | 1.2 | |
| Refractive index (at 20° C.) | 1.4945 | |
| Flash point according to DIN 51 376 | 318° C. | |
| Boiling temperature according to DIN 51 751 | 415° C. | |
| Pour point according to DIN 51 597 | 18° C. | |
| Unreacted ester | (less than 1%) | |
| IR spectrum | wave number | (cm) |
| | 2935 | 873 |
| | 2854 | 846 |
| | 1735 | 818 |
| | 1611 | 806 |
| | 1580 | 766 |
| | 1508 | 720 |
| | 1458 | |
| | 1172 | |

EXAMPLE 3

Additional sesquimers were obtained by the procedure of Example 2; product properties and differing reaction conditions are given in Table 2. The molar weight was determined osmometrically in a Knauer vapor pressure osmometer.

TABLE 2

| Preparation of sesquimers | | | | | | | |
|---|---|---|---|---|---|---|---|
| Exp. [g] | Ester [g] | HF [g] | Xylene [g] | T [°C.] | t [h] | IN | M [g/mole] |
| 3.1 | 300 | 85 | 300 | 50 | 5 | 11.1 | 784 |
| 3.2 | 300 | 71 | 300 | 47 | 22 | 12.3 | 792 |
| 3.3 | 300 | 62 | 300 | 35 | 6 | 15.6 | 837 |
| 3.4 | 1500 | 380 | 1300 | 50 | 6 | 15.6 | 790 |

EXAMPLE 4

In Table 3, compositions that may be used as cooling lubricants are given.

TABLE 3

| COOLING LUBRICANT MIXTURES | | | | | | | | | | | | | | | |
|---|---|---|---|---|---|---|---|---|---|---|---|---|---|---|---|
| EXAMPLE | 4.1 | 4.2 | 4.3 | 4.4 | 4.5 | 4.6 | 4.7 | 4.8 | 4.9 | 4.10 | 4.11 | 4.12 | 4.13 | 4.14 | 4.15 |
| R 11 | 98.5 | 49.0 | | | | | | | | | | | 98.5 | | |
| R 112 | | | 49.0 | 70.9 | | | | | | | | | | | |
| R 113 | | 49.0 | 49.0 | | 98.5 | 95.9 | 64.0 | 85.5 | | 97.0 | 94.8 | | | 95.7 | 95.7 |
| R 121 | | | | | | | | | | | | 98.5 | | | |
| R 122 | | | | | | | | | 98.3 | | | | | | |
| A 1,3 | | | | | | | | | | | | | | | |
| A 1,2 | | | | | | | | | | | | | | | |
| S2 | | | | | | | | | | | | | | | |
| JN = 14 | 1.5 | 2.0 | 2.0 | 1.5 | 1.5 | 1.5 | 1.5 | 1.5 | 1.5 | 3.0 | 5.0 | 1.5 | 0.75 | 0.75 | 0.75 |
| Ester | | | | | | | | | | | | | | | 0.75 |
| JN = 90-80 | | | | | | | | | | | | | | | |
| Ester | | | | | | | | | | | | | 0.75 | | |
| JN = 40 | | | | | | | | | | | | | | | |
| Ester | | | | | | | | | | | | | | | |
| JN = 80-90 | | | | | | | | | | | | | | | |
| SC | | | | | | | | | | | | | | | |
| Su | | | | | | | | | | | | | | 0.75 | |
| Ethanol | | | | | | | | | | | | | | | |
| i-Propanol | | | | 27.6 | | | 34.5 | | | | | | | | |
| n-Propanol | | | | | | 2.6 | | | | | | | | 2.6 | 2.6 |

TABLE 3-continued

COOLING LUBRICANT MIXTURES

| | | | | | | | | | | | | | | | |
|---|---|---|---|---|---|---|---|---|---|---|---|---|---|---|---|
| Acetone | | | | | | | | 13.0 | | | | | | | |
| n-Heptane | | | | | | | | | | | | | | | |
| Corrosion inhibitor | | | | | | | | | | | | | | 0.2 | |
| Based on tert. amine | | | | | | | | | | | | | | | |
| Corrosion Inhibitor | | | | | | | | | 0.2 | | 0.2 | | | | 0.2 |
| Based on oxazoline | | | | | | | | | | | | | | | |
| Corr.-Inhibitor | | | | | | | | | | | | | | | |
| Based on Triazole | | | | | | | | | | | | | | | |
| EXAMPLE | 4.16 | 4.17 | 4.18 | 4.19 | 4.20 | 4.21 | 4.22 | 4.23 | 4.24 | 4.25 | 4.26 | 4.27 | 4.28 | 4.29 | 4.30 |
| R 11 | | | | | | | | | | | | | | | |
| R 112 | 93.6 | | | | | | 93.6 | 93.4 | | | | | | | |
| R 113 | | 95.7 | 94.6 | 95.7 | 91.2 | 95.7 | | | 98.5 | 95.0 | 95.9 | 95.7 | 95.7 | 98.5 | 98.0 |
| R 121 | | | | | | | | | | | | | | | |
| R 122 | | | | | | | | | | | | | | | |
| A 1,3 | | | | | | | | | 1.5 | 5.0 | 1.5 | 1.5 | | 0.5 | 0.5 |
| A 1,2 | | | | | | | | | | | | | 0.75 | | |
| S2 | 1.5 | 0.75 | 1.5 | 0.75 | 3.0 | 1.5 | 1.5 | 1.5 | | | | | 0.75 | 0.5 | 0.5 |
| JN = 14 | | | | | | | | | | | | | | | |
| Ester | | | | | | | | | | | | | | | |
| JN = 90-80 | | | | | | | | | | | | | | | |
| Ester | | | | | | | | | | | | | | | |
| JN = 40 | | | | | | | | | | | | | | | |
| Ester | | | | | | | | | | | | | | | 0.5 |
| JN = 80-90 | | | | | | | | | | | | | | | |
| SC | | | | 0.75 | 2.0 | | | | | | | | | 0.5 | 0.5 |
| Su | | 0.75 | | | | | | | | | | | | | |
| Ethanol | | | 3.7 | | 3.6 | | | | | | | | | | |
| i-Propanol | 4.9 | 2.6 | | 2.6 | | 2.6 | | | | | 2.6 | 2.6 | 2.6 | | |
| n-Propanol | | | | | | | | | | | | | | | |
| Acetone | | | | | | | | | | | | | | | |
| n-Heptane | | | | | | | 4.9 | 4.9 | | | | | | | |
| Corrosion inhibitor | | | | | | | | 0.2 | | | | | | | |
| Based on tert. amine | | | | | | | | | | | | | | | |
| Corrosion Inhibitor | | | | 0.2 | | 0.2 | | | | | | 0.2 | 0.2 | | |
| Based on oxazoline | | | | | | | | | | | | | | | |
| Corr.-Inhibitor | | 0.2 | 0.2 | | 0.2 | | | | | | | | | | |
| Based on Triazole | | | | | | | | | | | | | | | |

EXAMPLE 5

The following components are mixed together in the proportions given below to produce compositions for pharmaceutical and/or cosmetic use.

| Example: component | 5.1 | 5.2 % by weight | 5.3 |
|---|---|---|---|
| Sesquimers | 7.50 | 10.000 | 15.000 |
| Polyoxyethylene fatty acid ester[1] | 6.00 | — | — |
| Capryl-capric acid-triglyceride[2] | 6.00 | — | — |
| Oleic acid decylester[3] | 2.00 | — | 4.000 |
| Wool wax alcohol ointment[4] | 3.00 | 5.000 | 6.000 |
| Cetyl alcohol[5] | 3.00 | — | 4.000 |
| Propylene glycol | 5.00 | — | 5.000 |
| Preservative | 9.50 | 9.500 | 9.500 |
| Perfume oil | 9.50 | 9.500 | 9.000 |
| Water (purified) | 48.50 | 40.996 | 41.996 |
| Glycerolmono-/-polyoxyethylene-stearide[6] | — | 9.000 | — |
| Eugenol[7] | — | 4.000 | — |
| Ethoxylated/hydrated wool wax[8] | — | 3.000 | — |
| α-tocopherol | — | 0.004 | 0.004 |
| Polyoxyethylene (20) sorbitan-monolaurate[9] | — | 4.000 | |
| Polyethyleneglycolstearyl-cetylester[10] | — | 5.000 | — |

-continued

| Example: component | 5.1 | 5.2 % by weight | 5.3 |
|---|---|---|---|
| Cetyl-stearylalcohol[11] | — | — | 5.000 |

[1]in the form of ARLATONE 983 S
[2]in the form of MIGLYOL 812
[3]in the form of CETIOL V
[4]in the form of EUCERINUM ANHYDR.
[5]in the form of LANETTE 16
[6]in the form of ARLACEL 165
[7]in the form of EUGENOL G
[8]in the form of LIPOLAN
[9]in the form of TWEEN 20
[10]in the form of CREMOPHOR 59
[11]in the form of EMULGADE 1000 Ni Typically, satisfactory results with topical formulations according to the present invention are obtained with preparations wherein the total amount of sesquimer is between about 1 and about 50%, preferably about 5 and about 25% of the vehicle.

Topical formulations according to the present invention may further comprise conventional carriers, such as pharmacologically-acceptable oils and wax, and/or such supplementary pharmaceutical adjuvants which are conventionally used in topical formulations, e.g., in conventional bases for ointments, creams, and jellies. In many cases it may be advisable to incorporate a structure-forming, thickening or gel-forming agent into the composition. Suitable such agents are, in particular, highly dispersed silicic acid, bentonites, modified montmorillonites, such as alkyl ammonium salts of montmorillonites, organic structure-forming, thickening and suspending agents, e.g., cetostearylic alcohol and modified castor oil products. Creams may be in form of emulsions, which may contain conventional pharmaceutically-acceptable emulsifying agents.

The compositions may further comprise pharmaceutical adjuvants, e.g., binders or lubricants for tabletting, stabilizing-, flavoring-, or emulsifying agents or preservatives.

What is claimed is:

1. A mixture containing (A) a wax adduct comprising the product produced by a process comprising the step of reacting hydrogen fluoride with at least one unsaturated wax at a temperature of less than 100° C., said wax having a melting point of less than about 60° C. and said product having a fluorine content in the range of about 0.1% to 4.3 by weight; and (B) a fluorochlorohydrocarbon which is suitable for use as a cooling lubricant and which has a boiling point of more than 20° C.

2. A mixture according to claim 1, wherein said fluorochlorohydrocarbon comprises a fluorohydrocarbon having 1 to 2 carbon atoms and a boiling point of more than about 20° C.

3. A mixture according to claim 2, wherein said hydrogen fluoride and said wax are reacted in a molar ratio between about 0.1:1 and about 2:1.

4. A mixture according to claim 1, further comprising a solvent having a higher boiling point than said fluorochlorohydrocarbon.

5. A mixture according to claim 4, wherein said solvent comprising at least one of the group consisting of ethanol, n-propanol, and isopropanol.

6. A mixture according to claim 1, further comprising an aliphatic hydrocarbon compound capable of forming an azeotrope with said fluorohydrocarbon.

7. A mixture according to claim 6, wherein said aliphatic hydrocarbon compound comprises n-heptane.

8. A mixture according to claim 1, further comprising at least one long-chain aliphatic alcohol containing 16 to 24 carbon atoms.

9. A mixture according to claim 8, wherein said aliphatic alcohol contains at least one carbon double bond.

10. A mixture according to claim 1, further comprising at least one oxazoline compound.

* * * * *

UNITED STATES PATENT AND TRADEMARK OFFICE
CERTIFICATE OF CORRECTION

PATENT NO. : 4,659,493

DATED : April 21, 1987

INVENTOR(S) : Heinz-Rudi FEIST et al.

It is certified that error appears in the above-identified patent and that said Letters Patent is hereby corrected as shown below:

Column 8, line 18, change "18°C" to -- -18°C--.

Signed and Sealed this

Fifth Day of July, 1988

*Attest:*

DONALD J. QUIGG

*Attesting Officer*

*Commissioner of Patents and Trademarks*